(12) United States Patent
Chevli

(10) Patent No.: US 9,371,459 B2
(45) Date of Patent: Jun. 21, 2016

(54) INKJET INKS AND INK SETS

(75) Inventor: Samit N Chevli, Hockessin, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 22 days.

(21) Appl. No.: 14/233,502

(22) PCT Filed: Jul. 19, 2012

(86) PCT No.: PCT/US2012/047369
§ 371 (c)(1),
(2), (4) Date: Jan. 17, 2014

(87) PCT Pub. No.: WO2013/013024
PCT Pub. Date: Jan. 24, 2013

(65) Prior Publication Data
US 2014/0160212 A1   Jun. 12, 2014

Related U.S. Application Data

(60) Provisional application No. 61/509,635, filed on Jul. 20, 2011.

(51) Int. Cl.
| | | |
|---|---|---|
| C09D 11/30 | (2014.01) | |
| C09D 11/322 | (2014.01) | |
| C09D 11/38 | (2014.01) | |
| C09D 11/40 | (2014.01) | |

(52) U.S. Cl.
CPC .............. C09D 11/30 (2013.01); C09D 11/322 (2013.01); C09D 11/38 (2013.01); C09D 11/40 (2013.01); *Y10T 428/24802* (2015.01)

(58) Field of Classification Search
CPC ...... C09D 11/30; C09D 11/322; C09D 11/38; C09D 11/40; Y10T 428/24802
USPC ............. 428/195.1; 106/31.86; 524/104; 347/100
See application file for complete search history.

(56) References Cited

U.S. PATENT DOCUMENTS

| | | |
|---|---|---|
| 5,022,592 A | 6/1991 | Zakheim et al. |
| 5,026,427 A | 6/1991 | Mitchell et al. |
| 5,085,698 A | 2/1992 | Ma et al. |
| 5,231,131 A | 7/1993 | Chu et al. |
| 5,545,739 A | 8/1996 | Mattingly et al. |
| 5,679,138 A | 10/1997 | Bishop et al. |
| 5,891,231 A | 4/1999 | Gnerlich et al. |
| 5,976,232 A | 11/1999 | Gore |
| 6,117,921 A | 9/2000 | Ma et al. |
| 6,231,654 B1 | 5/2001 | Elwakil |
| 6,262,152 B1 | 7/2001 | Fryd et al. |
| 6,306,994 B1 | 10/2001 | Donald et al. |
| 6,433,117 B1 | 8/2002 | Ma et al. |
| 6,852,156 B2 | 2/2005 | Yeh et al. |
| 2003/0089277 A1 | 5/2003 | Zakheim et al. |
| 2005/0090599 A1 | 4/2005 | Spinelli |

FOREIGN PATENT DOCUMENTS

| | | |
|---|---|---|
| EP | 0556649 A1 | 2/1993 |
| WO | 2011/002072 A1 | 1/2011 |

OTHER PUBLICATIONS

The International Bureau of WIPO, Geneva, Switzerland, International Preliminary Report on Patentability, Simin Baharlou, Authorized Office, Jan. 24, 2014, WO Counterpart of the Present Application.

*Primary Examiner* — Bruce H Hess
(74) *Attorney, Agent, or Firm* — John H. Lamming; Simon L. Xu

(57) ABSTRACT

The present disclosure pertains to an aqueous inkjet ink containing a pigment as colorant, a polymeric binder, an anionic surfactant and a 1-alkyl-2-pyrrolidone co-solvent. The present disclosure further pertains to an ink set containing this aqueous inkjet ink, as well as to methods of printing with this ink and ink set on a variety of substrates, and particularly hydrophobic substrates and nonporous media.

23 Claims, No Drawings

INKJET INKS AND INK SETS

CROSS-REFERENCE TO RELATED APPLICATION

This application claims priority under 35 U.S.C. §119 from U.S. Provisional Application Ser. No. 61/509,635, filed Jul. 20, 2011.

BACKGROUND OF THE DISCLOSURE

The present disclosure pertains to an aqueous inkjet ink containing an 1-alkyl-2-pyrrolidone, an anionic surfactant, a pigment colorant, and a polymeric binder. The present disclosure further pertains to an ink set containing this aqueous inkjet ink, as well as to methods of printing with this ink and ink set on a variety of substrates and particularly nonporous media.

Digital printing methods such as inkjet printing are becoming increasingly important for printing markets other than the desktop printing for the small office/home office market. The desktop printing market category is based upon the use of inks that have been optimized primarily for printing documents and photographs. Commercial printing applications range from printing wide format posters, banners, and billboards, to product coding on cans and bottles. For present purposes, the printing of wide format graphics will be considered as commercial graphics. Industrial printing applications include direct mail, addressing, product coding, and marking. High speed, page wide array industrial inkjet-based printers are also in use to print magazines, newspapers, etc. In addition, a new field of commercial printing is the printing of books on demand in a book store setting.

The inks used in those commercial/industrial applications have different requirements. In the desktop market, the print droplet must be tightly controlled. Additionally, desktop printers print on limited types of substrates. In commercial and industrial printers, on the other hand, a high premium is often placed on being able to print on a wide range of substrates. Industrial inkjet printing is an established, expanding market. Inkjet printers are widely used to place images on mail and business forms, on primary and secondary packaging. Also, the time for the printed image to dry is much more important for these commercial/industrial printers.

The substrates range from porous substrate like newspaper media, uncoated bond papers used to print books and transpromotional material to nonporous media used to print magazines and marketing literature.

Printing of non-porous media is particularly challenging because they can be coated with a polymeric coating such as styrene/butadiene copolymers, polyvinyl alcohols etc. These polymeric coating make the media very hydrophobic. It can be difficult to wet such media with aqueous ink. It is also difficult to dry the media after printing the aqueous inks. The drying problem is made worse due to the high speeds at which commercial inkjet web presses operate. Finally, after drying the printed image/printed text must permanently adhere to the coated offset (nonporous) media such that the ink is not smudged off in regular use.

The durability requirements for commercial/industrial printing dictate the use of pigments in preference to dyes. These pigments provide better, longer lasting and more durable printed images.

A need exists for highly stable, higher-quality and different property inks for ink-jet applications.

SUMMARY OF THE DISCLOSURE

In accordance with one aspect of the present disclosure, there is provided an inkjet ink for printing on porous, non-porous, and hybrid glossy print media comprising an aqueous vehicle comprising
  (a) at least one organic co-solvent;
  (b) at least one anionic surfactant
  (c) at least one pigment;
  (d) at least one polymeric binder; and
  wherein the organic co-solvent is a 1-alkyl-2-pyrrolidone and where the alkyl is a straight chain or branched alkyl having $C_6$ to $C_{18}$.

Another embodiment provides for the organic cosolvent to be selected from 1-hexyl-2-pyrrolidone, 1-octyl-2-pyrrolidone, 1 lauryl-2-pyrrolidone, and mixtures thereof.

Another embodiment provides for the anionic surfactant to be based on anions (sulfate, sulfonate phosphate) or pH-dependent anions (carboxylate).

Another embodiment provides for the pigment to be selected from polymerically dispersed pigments and self-dispersed pigments. Where the pigment is dispersed with polymer dispersants, the polymeric dispersants that can be used for dispersing the pigments are random or structured polymers commonly used for inkjet ink pigments and can be based acrylatelacrylic monomers or polyurethanes. The polymeric dispersant for dispersing the pigments can be neutralized prior to, during or after the start of the dispersion process.

Another embodiment provides that the polymeric binder is one or more members selected from the group consisting of polyurethane, acrylics, styrene acrylics, styrene butathenes, styrene butadiene acrylonitriles, neoprenes, ethylene acrylic acid copolymer, ethylene vinyl acetate, and mixtures thereof.

In another aspect, the present disclosure pertains to an inkjet ink set comprising at least three differently colored inks, at least one of which is the ink is as set forth above and as described in more detail below. In one embodiment, the ink set comprises at least three differently colored inks, one of which is a yellow ink, one of which is a magenta ink, and another of which is a cyan ink. In another embodiment the ink set comprises a fourth black ink in addition to the cyan, magenta and yellow inks.

In yet another aspect, the present invention pertains to a method for ink jet printing, comprising the steps of:
  (a) providing an ink jet printer that is responsive to digital data signals;
  (b) loading the printer with a substrate to be printed;
  (c) loading the printer with an inkjet ink or inkjet ink set as set forth above and as described in further detail below; and
  (d) printing onto the substrate using the inkjet ink or inkjet ink set in response to the digital data signals.

The printers used to print the inventive ink include desktop printers, commercial and industrial printers; the substrates include porous, non-porous, hybrid glossy print media, offset media and other media required for these printers.

These and other features and advantages of the present disclosure will be more readily understood by those of ordinary skill in the art from a reading of the following detailed description. It is to be appreciated that certain features of the disclosure which are, for clarity, described above and below in the context of separate embodiments, may also be provided in combination in a single embodiment. Conversely, various features of the disclosure that are, for brevity, described in the context of a single embodiment, may also he provided separately or in any subcombination. In addition, references in the singular may also include the plural (for example, "a" and "an" may refer to one, or one or more) unless the context specifically states otherwise. Further, references to values stated in ranges include each and every value within that range.

DETAILED DESCRIPTION OF THE PREFERRED EMBODIMENTS

Unless otherwise stated or defined, all technical and scientific terms used herein have commonly understood meanings by one of ordinary skill in the art to which this invention pertains.

Unless stated otherwise, all percentages, parts, ratios, etc., are by weight. When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

Unless it is otherwise stated or clear from the context, when discussing properties or components of an inkjet ink, the term "inkjet ink" may be understood to include inkjet ink sets.

When the term "about" is used in describing a value or an end-point of a range, the disclosure should be understood to include the specific value or end-point referred to.

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

As used herein, the term "dispersion" means a two phase system where one phase consists of finely divided particles (often in the colloidal size range) distributed throughout a bulk substance, the particles being the dispersed or internal phase and the bulk substance the continuous or external phase. The bulk system is often an aqueous system.

As used herein, the term "dispersion of pigment particles" is a stable dispersion of polymeric dispersed pigments which are normally used in inks and paints.

As used herein, the term "aqueous pigment dispersion" is an aqueous dispersion of pigments using polymeric dispersants.

As used herein, the term "dispersant" means a surface active agent added to a suspending medium to promote uniform and maximum separation of extremely fine solid particles often of colloidal size. For pigments, the dispersants are most often polymeric dispersants and usually the dispersants and pigments are combined using dispersing equipment, As used herein, the term "structured polymer" means a polymer that is composed of segments that differ in composition from each other. Examples include diblock, triblock, graft and star polymers.

As used herein, the term "random polymer" means a polymer that is composed of monomers distributed in a random fashion in the polymer in much the same mole ratio of the monomers in the initial monomer composition.

As used herein, the term "dispersible particles" are those particles that can be dispersed with dispersants including polymeric dispersants.

As used herein, the term "stable dispersion" means a particle dispersion where the particle size growth is less than 10% particle size growth and no flocculation when the dispersion is stored at room temperature for at least a week.

As used herein, the term "pigment" means any substance usually in a powder form which imparts color to another substance or mixture. Disperse dyes, white and black pigments are included in this definition.

As used herein, the term "PID" means the pigment to dispersant weight ratio in the initial dispersion formulation.

As used herein, the term "ambient conditions" refers to surrounding conditions, which are often around one atmosphere of pressure, about 50% relative humidity, and about 25° C.

As used herein, the term "crosslinking" means the chemical reaction between reactive groups on at least two different chemicals, where one of the chemicals is at least trisubstituted.

As used herein, the term "emulsion" means a stable mixture of two or more immiscible liquids held in suspension by small percentages of substances called emulsifiers, As used herein, the term "nonionic" means an oligomer or polymer derived from ethylene oxide and/or propylene oxide where there are at least 4 of the ethylene oxide or propylene oxide groups.

As used herein, the term "binder" means a film forming ingredient in the inkjet ink. This binder is normally added when the ink is formulated.

As used herein, the term "HSD" means High Speed Dispersing.

As used herein, the term "OD" means optical density.

As used herein, the term "Gloss" means observation of reflected light from a printed surface, normally the printed substrate is glossy paper.

As used herein, "smear resistance" refers to the resistance of an image to blurring when stroked with a highlighter marker.

As used herein, the term "SDP" means a self-dispersible", "self-dispersing", or self-dispersed pigments.

As used herein, the term "aqueous vehicle" refers to water or a mixture of water and at least one water-soluble organic solvent (co-solvent).

As used herein, the term "ionizable groups", means potentially ionic groups.

As used herein, the term "substantially" means being of considerable degree, almost all.

As used herein, the term "Mn" means number average molecular weight usually reported in daltons.

As used herein, the term "Mw" means weight average molecular weight usually reported in daltons.

As used herein, the term "Pd" means the polydispersity which is the weight average molecular weight divided by the number average molecular weight.

As used herein, the term "D50" means the particle size at which 50% of the particles are smaller; "D95" means the particle size at which 95% of the particles are smaller.

As used herein, the term "cP" means centipoise, a viscosity unit,

As used herein, the term "conductivity" means the property of a substance or mixture that describes its ability to transfer electricity and is reported as mS/cm.

As used herein, the term "AN" means acid number, mg KOH/gram of solid polymer.

As used herein, the term "neutralizing agents" means to embrace all types of agents that are useful for converting ionizable groups to the more hydrophilic ionic (salt) groups.

As used herein, the term "PUD" means the polyurethane dispersions described herein.

As used herein, the term "GPC" means gel permeation chromatography.

As used herein, the term "THF" means tetrahydrofuran.

As used herein, the term "Tetraglyme," means Tetraethylene glycol dimethyl ether.

As used herein, the term "Sulfolane" means tetramethylene sulfone.

As used herein, the term "DEA" means diethanolamine,

As used herein, the term "BMEA" means bis(methoxyethyl)amine.

As used herein, the term "Vazo® 68" refers to a free radical source for polymerization; the product is obtained from DuPont, Wilmington Del.

As used herein, the term "Liponics EG-1" refers to a humectant obtained from Lipo Chemicals, Paterson, N.J.

As used herein, Eternacoll® UH-50 is a polycarbonate dial from UBE Industries, Tokyo, Japan.

As used herein, the term "DBTDL" means dibutyltin dilaurate.

As used herein, Denacol® 321 is trimethylolpropane polyglycidyl ether, a cross-linking reagent from Nagase Chemicals Ltd., Osaka, Japan.

As used herein, the term "TMXDI" means m-tetramethylene xylylene diisocyanate,

As used herein, the term "PROXEL™ biocide" refers to a biocide obtained from Arch Chemicals, Norwalk, Conn.

As used herein, the term " Desmophen® 1200" refers to a 200, a polyester carbonate diol obtained from Bayer Material Science, Pittsburgh, Pa.

Unless otherwise noted, the above chemicals were obtained from Aldrich (Milwaukee, Wis.) or other similar suppliers of laboratory chemicals.

While seeking an inkjet ink that would have improved dry times without sacrifice of durability, several solvents were studied and it was found that 1-alkyl-2-pyrrolidones in combination with an anionic surfactant, a pigment colorant and a polymeric binder could satisfy the needs for this new ink. Furthermore, the ink needed to be compatible with media needed for commercial and industrial printing.

1-alkyl-2-pyrrolidones

The inkjet inks containing the 1-alkyl-2-pyrralidones were found to significantly improve the dry time without compromising print durability and other ink requirements. The anionic surfactant and the polymeric binder which are described below are also important to achieve these dry time/durability requirements. The dry time is important for the fast printing required in the new and emerging printing markets.

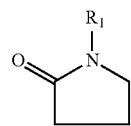

1-alkyl-2 pyrollidone

The alkyl group, $R_1$, is a straight chain or branched alkyl having $C_6$ to $C_{18}$. These include n-hexyl, n-octyl, branched octyl, decyl, lauryl and stearyl substituents. These 1-alkyl pyrrollidones have only modest water solubility and require the anionic surfactants to be effective.

The amount of the 1-alkyl-2-pyrrolidones is from 1 to 10 weight percent of the inkjet ink. Optionally, the amount is from 2 to 6 weight percent.

Anionic Surfactant

The anionic surfactants are based on anions (sulfate, sulfonate, phosphate) or pH-dependent anions (carboxylate).

Sulfates include alkyl sulfates: ammonium lauryl sulfate, sodium lauryl sulfate (SDS, sodium dodecyl sulfate, another name for the compound). Alkyl ether sulfates include, also known as sodium lauryl ether sulfate (SLES). Sulfonates include dioctyl sodium sulfosuccinates, sulfonate fluorosurfactants, perfluorooctanesulfonate, perfluorobutanesulfonate, and benzene sultanates; Phosphates include alkyl aryl ether phosphate, alkyl ether phosphate. Carboxylates include alkyl carboxylates: Fatty acid salts (soaps): sodium stearate, Sodium lauroyl sarcosinate, Carboxylate fluorosurfactants: perfluorononanoate, perfluorooctanoate The amount of anionic surfactant is 0.05 to 0.8 weight percent of the inkjet ink. Alternatively, the amount is 0.1 to 0.6 weight percent. The stability of the ink can be adversely effected if the conductivity of the ink is too high. Since the anionic surfactant directly adds to the conductivity, its use is limited to amounts described.

Pigments

Pigments suitable for used in the present embodiments are those generally well-known in the art for aqueous inkjet inks. Traditionally, pigments are stabilized by dispersing agents, such as polymeric dispersants or surfactants, to produce a stable dispersion of the pigment in the vehicle. Representative commercial dry pigments are listed in U.S. Pat. No. 5,085,698. Dispersed dyes are also considered pigments as they are insoluble in the aqueous inks used herein. More recently so-called "self-dispersible" or "self-dispersed" pigments (hereafter "SDP") have been developed. As the name would imply, SDPs are dispersible in water without dispersants.

Pigments which have been stabilized by polymeric dispersants may also have these dispersants crosslinked after the pigments are dispersed. An example of this crosslinking strategy is described in U.S. Pat. No. 6,262,152.

A wide variety of organic and inorganic pigments, alone or in combination, may be selected to make the ink. The term "pigment" as used herein means an insoluble colorant. The pigment particles are sufficiently small to permit free flow of the ink through the inkjet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Preferably, the pigment particle size should range from about 0.005 to about 5 micron and, most preferably, from about 0.005 to about 1 micron. The average particle size as measured by dynamic light scattering is preferably less than about 500 nm, more preferably less than about 300 nm.

The polymerically dispersed pigments may have the polymeric dispersants crosslinked after the dispersion process is completed. In this case the pigment is thought to have its polymeric dispersants crosslinked to each other by the addition of crosslinked components. A type of this crosslinked is described in U.S. Pat. No. 6,262,152.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much deflocculation in the process of preparing the inks as pigments in dry form.

The pigment colorants of the present disclosure can be self-dispersing or self-dispersed pigments. Self-dispersed pigments are surface modified with dispersibility imparting groups to allow stable dispersion without the need for a separate dispersant. For dispersion in an aqueous vehicle, the surface modification involves addition of hydrophilic groups, more specifically, ionizable hydrophilic groups. Methods of making self-dispersed pigments are well known and can be found for example in U.S. Pat. No. 5,554,739 and U.S. Pat. No. 6,852,156.

The self-dispersed pigment colorant can be further characterized according to its ionic character. Anionic self-dispersed pigment yields, in an aqueous medium, particles with anionic surface charge. Conversely, cationic self-dispersed pigment yields, in an aqueous medium, particles with cationic surface charge. Particle surface charge can be imparted, for example, by attaching groups with anionic or cationic moieties to the particle surface. The self-dispersed pigment of the present disclosure may have, although not necessarily, anionic hydrophilic chemical groups.

The self-dispersed pigments used in the present disclosure may be prepared, for example, by grafting a functional group or a molecule containing a functional group onto the surface of the pigment, or by physical treatment (such as vacuum plasma), or by chemical treatment (for example, by oxidatively treating the pigment surface with ozone, hypochlorous acid, sulfonic acid or the like). A single type or a plurality of types of hydrophilic functional groups may be bonded to one pigment particle. The type and degree of functionalization may be properly determined by taking into consideration, for example, dispersion stability in ink, color density, and drying properties at the front end of an inkjet head.

The anionic hydrophilic chemical groups on the self-dispersed pigment can be primarily carbonyl, carboxyl, hydroxyl groups, or a combination of carboxyl, carbonyl and hydroxyl groups; more specifically, the hydrophilic functional groups on the self-dispersed pigment are directly attached and are primarily carboxyl groups, or a combination of carboxyl and hydroxyl.

Polymeric Dispersants

Polymeric dispersants are those typically used for dispersing pigments, especially when these pigments are used for inkjet inks. Examples of these dispersants include polyurethanes and acrylic/acrylate copolymers. The polymers may be random or structured. The polymeric dispersant has a number average molecular weight of 2000 to 9500 daltons. Optionally, the molecular weight is 2000 to 6000 daltons.

The structured polymeric dispersant may be water soluble and may have a solubility of at least 10 grams of polymer/100 grams of water at 25° C. The solubility is measured in its neutralized form.

A subset of the random and structured polymer dispersants are ionically stabilized dispersants where the stabilization by the dispersant is ionic with little or any steric stabilization. These ionic polymeric dispersants are described in US Patent Application Publication No. 20050090599.

The polymeric dispersant for the pigment may be either a random or structured polymer. The polymer dispersant can be a copolymer of hydrophobic and hydrophilic monomers. The hydrophobic monomers are acrylates and the hydrophilic monomers are acrylics. Alternately, the polymeric dispersant may be a polyurethane.

Typical random polymeric dispersants have been described in U.S. Pat. No. 4,597,794.

The term "structured polymer" can mean polymers having a block, branched, graft or star structure. Examples of structured polymers include AB or BAB block copolymers such as disclosed in U.S. Pat. No. 5,085,698; ABC block copolymers such as disclosed in EP Patent Specification No. 0556649; and graft polymers such as disclosed in U.S. Pat. No. 5,231,131. Other polymeric dispersants that can be used are described, for example, in U.S. Pat. Nos. 6,117,921, 6,262,152, 6,306,994 and U.S. Pat. No. 6,433,117.

Polymer dispersants suitable for use in the present embodiments generally comprise both hydrophobic and hydrophilic monomers. Some examples of hydrophobic monomers used in random polymers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl(meth)acrylate and salts thereof. Also quaternary salts of dimethylaminoethyl(meth)acrylate may be employed.

Generally speaking the hydrophobic region is the part that contains the absorbing segment, which is the segment or function of the dispersant interacting with the pigment surface to effect dispersion. The hydrophilic segment is the segment that provides the stability of dispersion by interaction in the solute mixture to provide stabilization. This stabilization is characterized as steric stabilization or ionic stabilization. These phenomena were described by H Spinelli in Adv. Mater, 1998, 10, no. 15, page 1215 to 1218. The ionically stabilized polymeric dispersants described above have little if any steric stabilization.

The polymeric dispersant can be neutralized prior to the start of the dispersion process. That is, the initial mixture of solvent blend and polymer dispersant has an appropriate amount of neutralizing agent. Alternatively, the neutralizing agent may be added with the polar solvent during the dispersing process. An additional option is to have the polymeric dispersant partially neutralized in the initial mixture and add additional neutralizing agent in the polar solvent. The amount of neutralization of the polymeric dispersant in the final mixture is up to about 100% neutralized, and preferably up to about 90% neutralized.

The neutralizing agent can be hydroxides of the alkali metals, amines and the like. Examples of neutralizing agents include organic bases such as mono-, di, tri-methylamine, morpholine, n-methyl morpholine; alcohol amines such as dimethylethanolamine (DMEA), methyldiethanolamine, mono-, di, and tri-ethanolamine; pyridine; ammonium hydroxide; tetra-alkylammonium salts such as tetramethyl-ammonium hydroxide, tetraethyl-ammonium hydroxide; alkali metals such as lithium, sodium and potassium, and the like. Preferred neutralizing agents include dimethylethanolamine and sodium and potassium hydroxides, with potassium hydroxide being particularly preferred for inks to be used in thermal inkjet printers.

The polyurethane polymeric dispersants are prepared from isocyanates compounds, isocyanate-reactive compounds and an isocyanate or isocyanate reactive compound that has an ionic substituent. This ionic substituent is present in the polyurethane dispersant to stabilize in an aqueous solution. Often these polyurethane dispersants are prepared as a polyurethane prepolymer with excess isocyanate groups. Then a chain terminating isocyanate-reactive group is added to obtain polyurethane dispersant. The ionic content of the polyurethane can be as low as 10 and as high as 90 milliequivalents/gram when measured as an acid group or an amine group depending on the source of the ionic substituent. The ionic component is at least partially neutralized prior to its use as a dispersant. The molecular weight range of these polyurethanes is from 2000 to 9500 daltons.

Dispersion of the Pigment Particles

The dispersing step for the polymerically dispersed pigment may be accomplished in an ultrasonicator, media mill, a horizontal mini mill, an attritor, or by passing the mixture through a plurality of nozzles within a liquid jet interaction chamber at a liquid pressure of at least 5,000 psi to produce a uniform dispersion of the pigment particles in the aqueous carrier medium (microfluidizer). The media for the media mill are chosen from commonly available media, including zirconia, YTZ, and nylon. The media can be as small as about 0.1 microns, although particles larger than 0.3 microns are commonly used. These various dispersion processes are in a general sense well known in the art, as exemplified by U.S. Pat. Nos. 5,022,592, 5,026,427, 5,891,231, 5,679,138, 5,976,232 and US Patent Application Publication No. 20030089277. Preferred are media mill, and by-passing the mixture through a plurality of nozzles within a liquid jet interaction chamber at a liquid pressure of at least 5,000 psi. The mixing intensity required for the process is mixing normally associated with dispersion processes and not turbulent mixing of more modest mixing processes.

Combinations of dispersing equipment may be used. It may be more convenient to mix the solvent mixture, particle and polymeric dispersant in a High Speed Disperser (HSD) followed by milling in a media mill or a microfluidizer. The addition of the polar solvent may occur during the HSD portion of the processing and then the milling is continued in the media mill.

The final use of the particle dispersion may require that the solvent be removed from the particle dispersion mixture. The solvent may be removed by distillation processing, ultrafiltration or other convenient means. Any of these solvent removal methods may be incorporated into the process. The dispersing equipment and the solvent removal may be coupled and the solvent may be removed during the dispersing process and during the addition of the polar solvent.

One way to monitor the progress of the dispersion process is to measure the particle size and set a target value for the final D50 of the mixture. For typical pigments used for ink-jet inks the target value of the D50 is 125 nm or less, preferably less than 100 nm. Also the D95 and the particles smaller than 204 nm can be used as test criteria for the pigment dispersions.

A wide variety of organic and inorganic pigments, alone or in combination, may be selected for dispersion by this process. The dispersed pigment may be used in paints, inks and especially inkjet inks. The term "pigment" as used herein means an insoluble colorant and in the present application includes disperse dyes. The pigment particles are sufficiently small to permit free flow of the ink through the inkjet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss.

The dispersed pigment may be purified after the dispersion process by filtration, ultrafiltration or other processes used for purification of dispersed pigments.

Crosslinked Polymeric Dispersant

The polymeric dispersant may be crosslinked after the pigment dispersion is prepared prior to its inclusion in the inkjet ink.

For crosslinking the polymeric dispersant is substituted with crosslinkable moieties which are selected from the group consisting of acetoacetoxy, acid, amine, epoxy, hydroxyl, blocked isocyanates and mixtures thereof. Then a crosslinking agent is added and the crosslinking of the polymeric dispersant occurs. The crosslinking agent is selected from a group consisting of acetoacetoxy, acid, amine, anhydride, epoxy, hydroxyl, isocyanates, blocked isocyanates and mixtures thereof. The crosslinking of the polymeric dispersant is done after the pigment is dispersed. After the crosslinking step excess polymer can be removed by purification processes such as ultrafiltration.

Specific examples of crosslinking moiety/agent pairs are hydroxyl/isocyanate and acid/epoxy.

Polymeric Binder

A binder is a polymeric compound or a mixture of polymeric compounds that is added to the ink formulation. The binder can impart properties to the final printed material that, for example, gives greater durability to the printed material. Typical polymers used as binders in inkjet inks include polyurethane dispersions and polyurethane solutions, acrylics, styrene acrylics, styrene butadienes, styrene butadiene acrylonitriles, neoprenes, ethylene acrylic acids, ethylene vinyl acetate emulsions, latexes and the like. The binder may be a solution or stabilized as an emulsion by having ionic substituents such as carboxylic acids, sulfur containing acids, amine groups, and other similar ionic groups.

The binder can be used singly or in combination with other binders. Typically, the binder is polyurethane. An optional polyurethane binder is one that has a modest amount of crosslinking which when used in an inkjet ink enhances the durability of the printed image.

The binder is typically present in an ink in an amount of at least 0.2% by weight based on the total weight of the ink. The amount can be from 1 to 10 weight percent.

Aqueous Vehicle

The vehicle is a carrier for the colorant. An "aqueous vehicle" refers to a vehicle comprised of water, the 1-alkyl-2-pyrrlidone and an optional additional, water-soluble organic solvent. Selection of a suitable mixture depends on requirements of the specific application, such as desired surface tension and viscosity, the selected colorant, and compatibility with substrate onto which the ink will be printed.

Examples of water-soluble organic solvents include alcohols, ketones, keto-alcohols, ethers and others, such as thiodiglycol, sulfolane 1,3- dimethyl-2-imidazolidinone, and caprolactam; glycols such as ethylene glycol, diethylene glycol, triethylene glycol, tetraethylene glycol, propylene glycol, dipropylene glycol, tripropylene trimethylene glycol, butylene glycol and hexylene glycol; addition polymers of oxyethylene oxypropylene such as polyethylene glycol, polypropylene glycol and the like; trials such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether.

An aqueous vehicle will typically contain 30 wt % to 95 wt % (based on the weight of the aqueous vehicle) water.

Additives

Other ingredients (additives) may be formulated into the inkjet ink, to the extent that such other ingredients do not interfere with the stability and jettability of the finished ink, which may be readily determined by routine experimentation. Such other ingredients are in a general sense well known in the art.

In addition to the anionic surfactant described above additional nonionic surfactants may be added to the ink to adjust surface tension and wetting properties. Suitable additional surfactants include ethoxylated acetylene diols (e.g. Surfynols® series from Air Products), ethoxylated primary (e.g. Tomadol® series from Tomah Products) and secondary (e.g. Tergitol® series from Union Carbide) alcohols. The additional nonionic surfactants are typically used in the amount of from about 0.01 wt % to about 5 wt %, and preferably from about 0.2 wt % to about 3 wt %, based on the total weight of the ink.

Biocides may be used to inhibit growth of microorganisms. Buffers may be used to maintain pH. Buffers include, for example, tris(hydroxymethyl)-aminomethane ("Trizma" or "Tris").

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

The amount of vehicle in an ink is typically in the range of from about 70 wt % to about 99.4 wt %, and more typically from about 80 wt % to about 99 wt %. The 1-alkyl-2-pyrrolidone is 1 to 10 weight percent of the inkjet ink. The anionic surfactant is 0.1 to 0.8 weight percent of the inkjet ink. The pigments are generally present in amounts up to 15 wt %, more typically from 0.5 wt % to about 12 wt %, and optionally from 3 wt % to 10 wt %. The polymeric binders are generally present in amounts of 1 to 10 wt %. Percentages are weight percent of the total weight of ink.

Nonionic surfactants which are different than the anionic surfactant, when added, are generally in the range of from 0.2 wt % to 3 wt %, based on the total weight of the ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C., but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic.

Ink Set

The term "ink set" refers to all the individual inks or other fluids an inkjet printer is equipped to jet.

The ink sets in accordance with the present invention preferably comprise at least three differently colored inks (such as CMY), or at least four differently colored inks (such as CMYK), wherein at least one of the inks is an aqueous inkjet ink as described above.

The other inks of the ink set are preferably also aqueous inks, and may contain dyes, pigments or combinations thereof as the colorant. Such other inks are, in a general sense, well known to those of ordinary skill in the art.

Preferably all of the inks in the inkjet ink set are inkjet inks in accordance with the present invention as described above.

In addition to one or more of the typical CMYK colors, the ink sets in accordance with the present invention may further comprise one or more "gamut-expanding" inks, including different colored inks such as an orange ink, a green ink, a violet ink, a red ink and/or a blue ink, and combinations of full strength and light strengths inks such as light cyan and light magenta.

Substrate

The ink formulation, which has 1-alkyl-2-pyrrolidone, anionic surfactant, pigment, and polymeric binder present, is an effective inkjet ink formulation for any normal substrate: plain paper, photo paper, offset media and other hydrophobic media. Since the formulation has excellent dry time it is well suited for use in high throughput printing.

EXAMPLES

Polyurethane Dispersant (DEA terminated TMXDI/UH-50/DMPA)

To a dry, alkali- and acid-free, 2 liter flask equipped with an additional funnel, a condenser and a stirrer, under a nitrogen atmosphere was added Eternacol® UH-50 (117.0 g), dimethylol propionic acid (87.0 g) and Sulfolane (220.0 g). The contents were heated to 115° C. and mixed under a nitrogen gas purge for 30 minutes. The temperature was then lowered to 60° C. and DBTDL (0.08 g) was added followed by TMXDI (238.0 g) via the addition funnel. The residual TMXDI in the additional funnel was rinsed into the flask with Sulfalane (15.0 g). The stirred reaction mass was allowed to exotherm. When exotherm began to slow, the temperature was maintained at 100° C. while monitoring the isocyanate content until it reached 1.06%. The temperature was lowered to 60° C. To the flask was added DEA (18.04 g) via the additional funnel followed by rinsing the residual BMEA in additional funnel into the flask with Sulfolane (5.0 g). The mixture was maintained at 60° C. for 90 minutes. A solution of 45% KOH in water (56.56 g) and additional de-ionized water (776.87 g) were added over a period of 5 minutes to give a 70% neutralized polyurethane resin in water. This was allowed to stir and cool to room temperature to provide a polyurethane dispersion with 27.49% of solids and a measured acid number of 79.03 mg KOH/gram polymer.

Preparation of Black Pigmented Dispersion

The following procedure was used to prepare a black pigmented dispersion using Nipex 180 and Polyurethane Dispersant. Using a microfluidizer, a premix was prepared at typically 20-30% pigment loading and the targeted dispersant level was selected at a pigment/dispersant (P/D) ratio of 2.0. A P/D of 2.0 corresponds to a 40% dispersant level on pigment. A co-dispersant, Surfynol 104 in Dowanol DPM at a P/D=100 was added to the total dispersion formulation to facilitate wetting of pigment and dissolution of dispersant in the premix stage for ease of grinding during milling stage. Dispersant 1 was preneutralized with KOH to facilitate solubility and dissolution into water. An additional 6.91 g of a 45% KOH solution in water was added. During the premix stage and milling stage, de-ionized water (1200 g) was added to adjust viscosity and control temperature. After completion of the milling stage, the remaining let-down of de-ionized water (450.0 g) was added and thoroughly mixed. The final pigment dispersion contains 23.15% of solids.

The pigment dispersion was purified using an ultrafiltration process to remove co-solvent(s) and excess dispersant, and filter out other impurities that may be present. After completion, the pigment level in the dispersion was reduced to 10 to 15%. A single black dispersion was prepared using the Polyurethane Dispersant 1.

| Pigmented Dispersion | Pigment | Pigment/ Dispersant | Polyurethane Dispersant No. | Particle Size D50 (nm) | D95 (nm) |
|---|---|---|---|---|---|
| K1 | Nipex 180 | 2 | 1 | 107 | 185 |

Preparation of Cross-Linked Pigment Dispersion XL-K1

In the cross-linking step, Denacol0 321was mixed with one of the pigmented Dispersion K1, and heated at temperatures between 60° C. and 80 ° C. with efficient stirring for 6-8 hours. After the cross-linking reaction was completed, the pH was adjusted to at least about 8.0 if needed. The composition of the cross-linked Pigment Dispersion XL-K1 is summarized below.

| Cross-linked Dispersion | Pigmented Dispersion | Cross-linkable Moiety | Cross-linking Compound |
|---|---|---|---|
| XL-K1 | K1 | COOH, OH | Denacol ® 321 |

Polyurethane Binder

To a dry, alkali- and acid-free flask, equipped with an addition funnel, a condenser, stirrer and a nitrogen gas line, was added 699.2 g Desmophene C 200, a polyester carbonate diol, 280.0 g acetone and 0.06g dibutyltin laurate. The contents were heated to 40° C. and mixed well. 189.14 g isophorone diisocyanate was then added to the flask via the addition funnel at 40° C. over 60 min, with any residual IPDI being rinsed from the addition funnel into the flask with 15.5 g acetone.

The flask temperature was raised to 50° C., then held for 30 minutes. 44.57 g dimethylol propionic acid followed by 25.2 g triethylamine was added to the flask via the addition funnel, which was then rinsed with 15.5 g acetone. The flask temperature was then raised again to 50° C. and held at 50° C. until NCO % was less than 1.23%.

With the temperature at 50° C., 1498.0 g deionized (DI) water was added over 10 minutes, followed by mixture of 24.4 g ethylene diamine (as a 6.25% solution in water) and 118.7 g triethylene tetramine (as a 6.25% solution in water) over 5 minutes, via the addition funnel, which was then rinsed with 80.0 g water. The mixture was held at 50° C. for 1 hr, then cooled to room temperature.

Acetone (−310.0 g) was removed under vacuum, leaving a final dispersion of polyurethane with about 35.0% solids by weight. The triethylene tetramine provides the crosslinking.

Preparation of Inks

Inks were prepared according to the formulations in the following tables wherein amounts are ink weight percent of the total weight of ink. Although in general the ink components may be added in any convenient order, the 1-alkyl-2-pyrrolidone can be added after the anionic surfactant to provide optimum interaction. Ingredients were mixed together and filtered. Water was deionized.

The inks were printed with an Epson B310N printer. A test pattern was printed which was tested for dry time.

The inks were tested by a dry time test. The dry time test was carried out by rubbing the print samples with a piece of paper held by index finger at various times after the print was completed. The color transfer to the paper was measured using a densitometer; the higher the reading indicates more color transfer and poorer dry time.

Ink Example 1 and Comparative Example 1 were prepared with the composition as listed in Table 1. Comparative Example is different in that there is no 1-octyl-2-pyrrolidone present. Stability testing of Ink Example 1 was done by storing a sample at 60° for two weeks and comparing physical properties of the ink.

TABLE 1

Ink Formulation

| Material | Ink Example 1 Weight % | Comp Example 1 Weight % |
|---|---|---|
| Cross-linked Black Pigment Dispersion | 4.00 | 4.00 |
| 1-Octyl-2-Pyrrolidone | 4.00 | 0.00 |
| Surfynol 104E | 0.50 | 0.50 |
| Polyethylene glycol (Mw4600) | | 4.00 |
| Glycerol | 0.00 | 0.00 |
| Sodium Lauryl Sulfate | 0.5 | 0.5 |
| KOH | 0.03 | 0.03 |
| Polyurethane binder | 2.00 | 2.00 |
| D.I. Water | to make up to100% | |

TABLE 2

Physical Properties of Ink Example 1 and Comp Example 1
Physical Properties Measured at Ambient Conditions

| | Ink Example 1 | Comp Example 1 |
|---|---|---|
| Surface Tension (mN/m) | 26 | 29.2 |
| Viscosity, (cps) | 3.97 | 3.74 |
| pH | 7.95 | 7.86 |
| Conductivity, (mS/cm) | 1.53 | 1 |
| Particle Size D50 (nm) | 109.3 | 109.2 |
| Mean Value | 113.7 | 113 |
| % < 204 nm | 98.64 | 99.01 |
| After Stability Test at 60 C./2 weeks | | |
| Viscosity, (cps) | 3 | |
| pH | 7.1 | |
| Conductivity, (mS/cm) | 1.7 | |
| Particle Size D50 (nm) | 102.8 | |
| Mean Value | 104.3 | |
| % < 204 nm | 100 | |

Ink Example 1 is stable in that the key physical properties are not significantly changed over the course of storing at 60° C. for two weeks.

Ink Example 2 and Comparative Example 2 were prepared with the composition as listed in Table 3. Comparative Example 2 is different in that there is no anionic surfactant is present.

TABLE 3

Ink Formulation

| Material | Ink Example 2 wt, % | Comp Example 2 wt, % |
|---|---|---|
| Cross-linked Black Pigment Dispersion | 4 | 4 |
| 1,2-Hexandiol | 7 | 7 |
| Dowanol DPM | 5 | 0 |
| 1-Octyl-2-Pyrrolidone | 4 | 4 |

TABLE 3-continued

Ink Formulation

| Material | Ink Example 2 wt, % | Comp Example 2 wt, % |
|---|---|---|
| Sodium Lauryl Sulfate | 0 | 0.4 |
| Surfynol 104E | 0.75 | 0.75 |
| KOH | 0.03 | 0.03 |
| Polyurethane Binder | 5 | 5 |
| DI Water | Make 100% | |

A cyan ink was prepared using 1-octyl-2-pyrrolidone, and 1-lauryl-2-pyrrolidone. The formulation of this ink example is given in Table 4

TABLE 4

Cyan inks with 1-octyl-2-pyrrolidone and 1-lauryl-2-pyrrolidone

| Material | Ink Example 3 wt, % | Ink Example 4 wt, % |
|---|---|---|
| Cyan Pigment Dispersion | 3 | 3 |
| 1,2-Hexandiol | 2 | 2 |
| 1-Octyl-2-Pyrrolidone | 4 | 0 |
| 1-Lauryl-2-Pyrrolidone | 0 | 4 |
| Sodium Lauryl Sulfate | 0.4 | 0.4 |
| Surfynol 104E surfactant | 1.25 | 1.25 |
| KOH | 0.06 | 0.06 |
| Polyurethane Binder | 1.5 | 1.5 |
| DI Water | Make 100% | |

Ink Example 1 and Comparative Example 1 were printed on offset paper to using an Epson B310 printer. 6.7 µl/mm² were put down on the paper. Dry time test with the optical density measurement was completed.

TABLE 5

Dry Time Results

| | OD | \multicolumn{5}{c}{Dry time (seconds)} |
|---|---|---|---|---|---|---|
| | | 5 | 10 | 30 | 60 | 90 |
| \multicolumn{7}{c}{Mohawk 50/10 Blue White Gloss Paper (80#)} |
| Ink Example 1 | 1.47 | 0.64 | 0.14 | 0.06 | 0.06 | 0.06 |
| Comp Example 1 | 1 | 0.69 | 0.63 | 0.47 | 0.2 | 0.06 |
| \multicolumn{7}{c}{Mohawk 50/10 Blue White Matt Paper (80#)} |
| Ink Example 1 | 1.42 | 0.81 | 0.16 | 0.06 | 0.06 | 0.06 |
| Comp Example 1 | 1.31 | 0.81 | 0.68 | 0.3 | 0.08 | 0.06 |
| \multicolumn{7}{c}{Mohawk 50/10 Blue White Gloss Paper (80#)} |
| Ink Example 1 | 1.47 | 0.64 | 0.14 | 0.06 | 0.06 | 0.06 |
| Comp Example 1 | 1 | 0.69 | 0.63 | 0.47 | 0.2 | 0.06 |
| \multicolumn{7}{c}{Mohawk 50/10 Blue White Matt Paper (80#)} |
| Ink Example 1 | 1.42 | 0.81 | 0.16 | 0.06 | 0.06 | 0.06 |
| Comp Example 1 | 1.31 | 0.81 | 0.68 | 0.3 | 0.08 | 0.06 |

The formulation with 1-octyl-2-pyrrolidone was significantly better than the comparative example that had polyethylene glycol and glycerol as the organic solvent in the ink.

Ink Example 2 and Comparative Example 2 were printed on offset paper using an Epson B310 printer. 7 µl/mm² were put clown on the paper. Dry time test with the optical density measurement was completed.

TABLE 6

Dry Time Results

| | | Dry time (seconds) | | |
|---|---|---|---|---|
| | OD | 10 | 20 | 30 |
| Mohawk 50/10 Blue White Gloss Paper (80#) | | | | |
| Comp Example 2 | 1.35 | 0.2 | 0.13 | 0.08 |
| Ink Example 2 | 1.3 | 0.06 | 0.06 | 0.06 |
| Mohawk 50/10 Blue White Matt Paper (80#) | | | | |
| Comp Example 2 | 1.4 | 0.24 | 0.16 | 0.08 |
| Ink Example 2 | 1.33 | 0.08 | 0.06 | 0.06 |

Ink Example 2 has significantly better dry time performance.

The invention claimed is:

1. An inkjet ink for printing on porous, non-porous, and hybrid glossy print media comprising an aqueous vehicle comprising
    (a) at least one organic co-solvent;
    (b) at least one pigment;
    (c) at least one polymeric binder; and
    (d) at least one anionic surfactant which is not flurinated;
    wherein the organic co-solvent is a 1-alkyl-2-pyrrolidone and where the alkyl is a straight chain or branched alkyl having $C_6$ to $C_{18}$.

2. The inkjet ink of claim 1 where the 1-alkyl-2-pyrrolidone is 1 octyl-2 pyrrolidone.

3. The inkjet ink of claim 1 where the amount of 1-alkyl-2-pyrrolidone is 1 to 10 weight percent of the inkjet ink.

4. The inkjet ink of claim 1 where the amount of the anionic surfactant is 0.05 to 0.8 weight percent of the inkjet ink.

5. The inkjet ink of claim 1 where the ink further comprises a nonionic surfactant.

6. The inkjet ink of claim 5 where the amount of the nonionic surfactant is 0.1 to 1.0 weight percent of the inkjet ink.

7. The inkjet ink of claim 1 where the pigment is selected from the group consisting of a polymerically dispersed pigment and a self dispersed pigment.

8. The inkjet ink of claim 1 where the pigment is a polymerically dispersed pigment.

9. The inkjet ink of claim 1 further comprising a polymeric dispersant which disperses the pigment and is selected from the group consisting of acrylic dispersants comprising acrylic and acrylate monomers and polyurethane dispersant and mixtures thereof.

10. The inkjet ink of claim 9 where the polymeric dispersant is substituted with crosslinkable moieties where the crosslinkable moieties are selected from the group consisting of acetoacetoxy, acid, amine, epoxy, hydroxyl, blocked isocyanates and mixtures thereof.

11. The inkjet ink of claim 10 where the polymeric dispersant substituted with crosslinkable moieties is reacted with a crosslinking agent where the crosslinking agent is selected from acetoacetoxy, acid, amine, anhydride, epoxy, hydroxyl, isocyanates, blocked isocyanates and mixtures thereof.

12. The inkjet ink of claim 1 where the polymeric binder is selected from the group consisting of acrylic polymeric binder comprising acrylic and acrylate monomers and polyurethane binder and mixtures thereof.

13. The inkjet ink of claim 1 where the polymeric binder is 1 to 10 weight percent of the inkjet ink.

14. An inkjet ink set comprising at least three differently colored inks, at least one of which is an ink as set forth in claim 1.

15. The inkjet ink set of claim 14, wherein the ink set comprises at least three differently colored inks, at least one of which is a yellow ink, at least one of which is a magenta ink, and at least one of which is a cyan ink.

16. The inkjet ink of claim 15 which further comprises a black ink.

17. A method for ink jet printing, comprising the steps of:
  (a) providing an ink jet printer that is responsive to digital data signals;
  (b) loading the printer with a substrate to be printed;
  (c) loading the printer with an inkjet ink set as set forth in claim 16,
  (d) printing a print onto the substrate using the inkjet ink or inkjet ink set in response to the digital data signals.

18. A method for ink jet printing, comprising the steps of:
  (a) providing an ink jet printer that is responsive to digital data signals;
  (b) loading the printer with a substrate to be printed;
  (c) loading the printer with an inkjet ink set as set forth in claim 15,
  (d) printing a print onto the substrate using the inkjet ink or inkjet ink set in response to the digital data signals.

19. The method of ink jet printing of claim 18 where the substrate is a hydrophobic substrate.

20. The method of ink jet printing of claim 18 where the substrate is a nonporous media.

21. A method for ink jet printing, comprising the steps of:
  (a) providing an ink jet printer that is responsive to digital data signals;
  (b) loading the printer with a substrate to be printed;
  (c) loading the printer with an inkjet ink as set forth claim 1,
  (d) printing onto the substrate using the inkjet ink in response to he digital data signals.

22. The method of ink jet printing of claim 21 where the substrate is a hydrophobic substrate.

23. The method of ink jet printing of claim 21 where the substrate is a nonporous media.

* * * * *